US009849914B2

(12) United States Patent
Elliott et al.

(10) Patent No.: US 9,849,914 B2
(45) Date of Patent: Dec. 26, 2017

(54) FRONT BODY STRUCTURE OF A VEHICLE FOR ENHANCED CRASH PROTECTION

(71) Applicants: Hyundai America Technical Center, Inc, Superior Township, MI (US); Hyundai Motor Company, Seoul (KR); Kia Motors Corporation, Seoul (KR)

(72) Inventors: Eric Elliott, Canton, MI (US); Christopher Roche, Ypsilanti, MI (US); Jashwanth Reddy, Canton, MI (US); Bavneet Brar, Ann Arbor, MI (US)

(73) Assignees: Hyundai America Technical Center, Inc, Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/079,570

(22) Filed: Mar. 24, 2016

(65) Prior Publication Data

US 2017/0274934 A1    Sep. 28, 2017

(51) Int. Cl.
  *B62D 21/15*    (2006.01)
  *B60R 19/44*    (2006.01)

(52) U.S. Cl.
  CPC ............ *B62D 21/155* (2013.01); *B60R 19/44* (2013.01)

(58) Field of Classification Search
  CPC ... B60R 19/54; B60R 19/34; B60R 2019/007; B60R 2019/247; B60R 2019/262; B62D 25/08; B62D 21/15; B62D 21/152

USPC .......... 293/133, 154, 155; 296/187.09, 187.1
See application file for complete search history.

(56) References Cited

U.S. PATENT DOCUMENTS

| 6,042,163 A * | 3/2000 | Reiffer ................... B60R 19/18 293/102 |
| 6,957,846 B2 | 10/2005 | Saeki |
| 8,807,632 B2 * | 8/2014 | Ramoutar ............... B60R 19/24 293/132 |

(Continued)

FOREIGN PATENT DOCUMENTS

| DE | 102013007263 A1 | 11/2014 |
| JP | 2003-191805 | * 7/2003 |
| JP | 2014-113894 A | 6/2014 |

*Primary Examiner* — Dennis H Pedder
(74) *Attorney, Agent, or Firm* — Mintz Levin Cohn Ferris Glovsky and Popeo, P.C.; Peter F. Corless

(57) ABSTRACT

A front body structure of a vehicle for enhanced crash protection includes: a front bumper beam extending transversely across a body of the vehicle; a pair of longitudinal sidemembers extending longitudinally along the vehicle body; a front bumper tip enclosure attached to the front bumper beam and substantially enclosing an end portion of the front bumper beam; and a sidemember angle tie extending at an angle with respect to the longitudinal sidemembers, a front end of the sidemember angle tie attached to the front bumper tip enclosure, and a rear end of the sidemember angle tie attached to one of the longitudinal sidemembers. The sidemember angle tie changes a direction of an impact load on the vehicle body to a longitudinal direction by transferring the impact load along an angular path to the one of the longitudinal sidemembers to which the sidemember angle tie is attached.

22 Claims, 16 Drawing Sheets

(56) References Cited

U.S. PATENT DOCUMENTS

| | | | |
|---|---|---|---|
| 2014/0091585 A1* | 4/2014 | Ramoutar | B60R 19/24 |
| | | | 293/133 |
| 2014/0312637 A1 | 10/2014 | Ramoutar et al. | |
| 2014/0367985 A1 | 12/2014 | Weil et al. | |
| 2015/0298634 A1* | 10/2015 | Hara | B60R 19/34 |
| | | | 293/133 |
| 2016/0059810 A1* | 3/2016 | Watanabe | B60R 19/24 |
| | | | 293/133 |

* cited by examiner

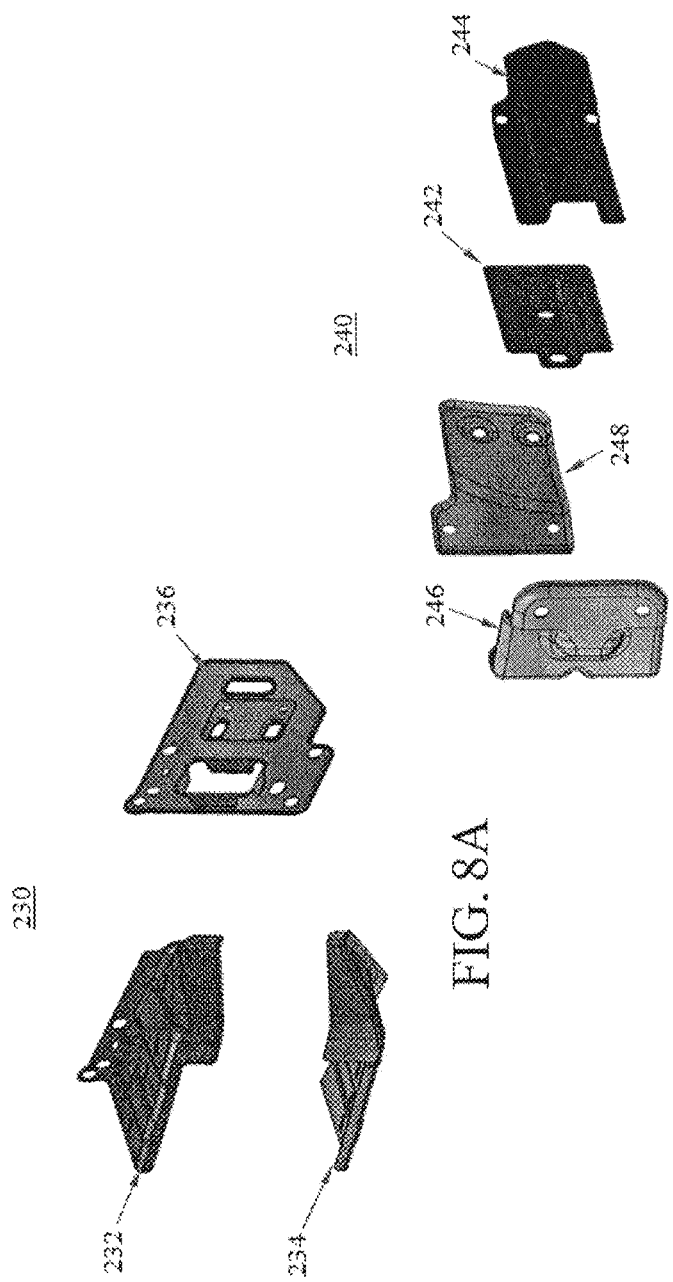

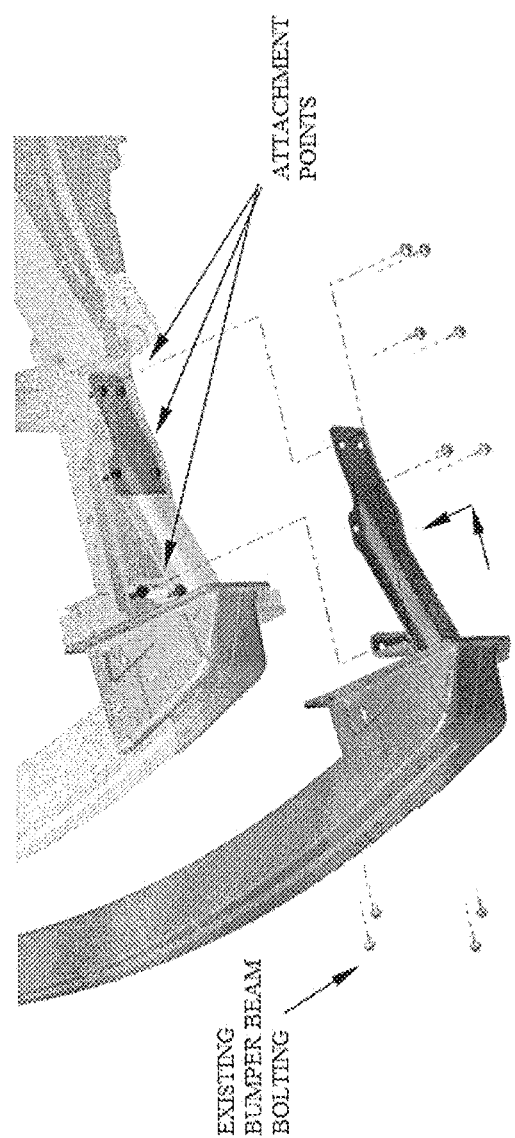

FRONT BODY STRUCTURE OF A VEHICLE FOR ENHANCED CRASH PROTECTION

TECHNICAL FIELD

The present disclosure relates generally to vehicular safety, and more particularly, to a front body structure of a vehicle for enhanced crash protection.

BACKGROUND

The front body structure of a vehicle is important for protecting occupants in frontal crashes. The integrity of a vehicle front body structure can be evaluated using crash tests, which involve a form of destructive testing usually performed in order to ensure safe design standards for various modes of transportation. There are different types of crash testing—administered in the United States by organizations including the National Highway Transportation Safety Administration (NHTSA) and the Insurance Institute for Highway Safety (IIHS)—for evaluating different aspects of a vehicle's crashworthiness. The most traditional crash test is known as a "frontal-impact crash test," whereby a vehicle is driven to collide head-on with a barrier, such as a concrete wall. FIG. 1A illustrates an example frontal-impact crash test, in which the angle of impact directly opposes the direction in which the vehicle 100 travels. In this case, a load generated by colliding with the barrier 110 is experienced throughout the entire front end of the vehicle 100.

Meanwhile, in "overlap crash tests," only part of the front end of a vehicle impacts a barrier. The impact force remains approximately the same as in a frontal-impact test, but a smaller fraction of the vehicle is required to absorb the force. In this regard, the IIHS developed a Small Overlap Impact (SOI) test, in which 25% of the front vehicle width strikes a rigid barrier 110 on the driver-side, as shown in FIG. 1B.

Unique challenges arise in protecting vehicle occupants in offset collisions. For example, if the longitudinal sidemembers on each side of the vehicle frame cannot fully absorb the kinetic energy of a front-end impact, the crash causes cockpit intrusion from wheel impact. Unfortunately, most modern unibody longitudinal sidemembers are inboard of the 25% overlap impact zone. Thus, the sidemembers cannot fully absorb the kinetic energy of such crash events.

SUMMARY OF THE DISCLOSURE

The present disclosure provides a front body structure of a vehicle that enhances crash protection by increasing the potential for energy absorption at the front bumper and the longitudinal sidemembers during an offset collision. The vehicle front body structure disclosed herein includes a front bumper tip enclosure attached to the front bumper beam that substantially enclosing an end portion of the front bumper beam and a sidemember angle tie that extends at an angle with respect to the longitudinal sidemembers of the vehicle. The front bumper tip enclosure and sidemember angle tie, which can be installed along with a conventional vehicle front body structure at the time of assembly or retrofitted to an existing front body structure, provides an energy path from the impact barrier contact area transversely inboard to the longitudinal sidemembers of the vehicle. The vehicle kinetic energy is transmitted first from the front bumper and front bumper tip enclosure to the sidemember angle tie, and then from the sidemember angle tie to a single longitudinal sidemember. The energy resulting from the a small-overlap crash impact is thus absorbed by the sidemember, rather than the front wheels, as the sidemember crushes longitudinally and ultimately minimizes vehicle cockpit intrusion to protect occupants therein.

According to embodiments of the present disclosure, a front body structure of a vehicle for enhanced crash protection includes: a front bumper beam extending transversely across a body of the vehicle; a pair of longitudinal sidemembers extending longitudinally along the vehicle body, each of the longitudinal sidemembers perpendicularly attached at a front end thereof to the front bumper beam; a front bumper tip enclosure attached to the front bumper beam and substantially enclosing an end portion of the front bumper beam; and a sidemember angle tie extending at an angle with respect to the longitudinal sidemembers, a front end of the sidemember angle tie attached to the front bumper tip enclosure at a position outside of an imaginary area formed by the longitudinal sidemembers and the front bumper beam, and a rear end of the sidemember angle tie attached to one of the longitudinal sidemembers. The sidemember angle tie changes a direction of an impact load on the vehicle body to a longitudinal direction by transferring the impact load along an angular path to the one of the longitudinal sidemembers to which the sidemember angle tie is attached.

The rear end of the sidemember angle tie may be attached to an outboard face of the one of the longitudinal sidemembers. Also, the rear end of the sidemember angle tie may be attached to the one of the longitudinal sidemembers at a position inboard of a wheel envelope of the vehicle.

On the other hand, the front end of the sidemember angle tie may extend from an outboard tip of the front bumper beam toward the one of the longitudinal sidemembers. Also, the front end of the sidemember angle tie may be longitudinally attached to a rearward face of the front bumper tip enclosure, and the rear end of the sidemember angle tie may be laterally attached to an outboard face of the one of the longitudinal sidemembers.

The front bumper tip enclosure may extend from an outboard tip of the front bumper beam to at least an attachment point between the front bumper beam and the one of the longitudinal sidemembers.

During a collision, the front bumper tip enclosure may prolong the folding of the end portion of the front bumper beam about the one of the longitudinal sidemembers. Similarly, the front bumper tip enclosure may be configured to be crushed to absorb the impact load on the vehicle body. The crushing of the front bumper tip enclosure may transfer the impact load to the sidemember angle tie. Furthermore, the sidemember angle tie may prolong the buckling of the one of the longitudinal sidemembers to which the sidemember angle tie is connected.

The front bumper tip enclosure may include an upper piece covering an upper part of the end portion of the front bumper beam and a lower piece covering a lower part of the end portion of the front bumper beam, the upper piece and the lower piece attached to one another at one or more attachment points. The front bumper tip enclosure may further include a side attachment member that attaches at least one of the upper piece and the lower piece of the front bumper tip enclosure to at least one of the sidemember angle tie and the one of the longitudinal sidemembers. The end portion of the front bumper beam may be substantially enclosed by the upper piece, the lower piece, and the side attachment member of the front bumper tip enclosure.

In addition, the sidemember angle tie may include an inner piece facing inboard of the vehicle and an outer piece facing outboard of the vehicle, the inner piece and the outer piece attached to one another at one or more attachment points. A hollow passageway may be formed within the inner piece and the outer piece of the sidemember angle tie. The sidemember angle tie may further include a front attachment member positioned at the front end of the sidemember angle tie that attaches at least one of the inner piece and the outer piece of the sidemember angle tie to at least one of the front bumper beam and the front bumper tip enclosure. Moreover, the sidemember angle tie may further include a rear attachment member positioned at the rear end of the sidemember angle tie that attaches at least one of the inner piece and the outer piece of the sidemember angle tie to the one of the longitudinal sidemembers.

The angle at which the sidemember angle tie extends with respect to the one of the longitudinal sidemembers may be between 15 degrees and 30 degrees.

Meanwhile, the front bumper tip enclosure and the sidemember angle tie may be formed with respective uniform thicknesses. Also, the front bumper tip enclosure and the sidemember angle tie may be formed of steel.

A middle portion of the sidemember angle tie may be U-shaped, and the U-shaped portion may be flanked on opposing sides thereof by flat portions.

The front bumper tip enclosure and the sidemember angle tie may be situated on a driver-side of the vehicle. Alternatively, the front bumper tip enclosure and the sidemember angle tie may be one of a pair of front bumper tip enclosures and a pair of sidemember angle ties, respectively, one of the front bumper tip enclosures and one of the sidemember angle tie are situated on a driver-side of the vehicle, and the other front bumper tip enclosure and the other of the sidemember angle tie are situated on a passenger-side of the vehicle.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A and 8B illustrate exemplary exploded views of the front bumper tip enclosure and sidemember angle tie;

FIGS. 12A-12C illustrate additional exemplary three-dimensional views showing the attachment points on the front bumper tip enclosure and sidemember angle tie assembly.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Figure 2:
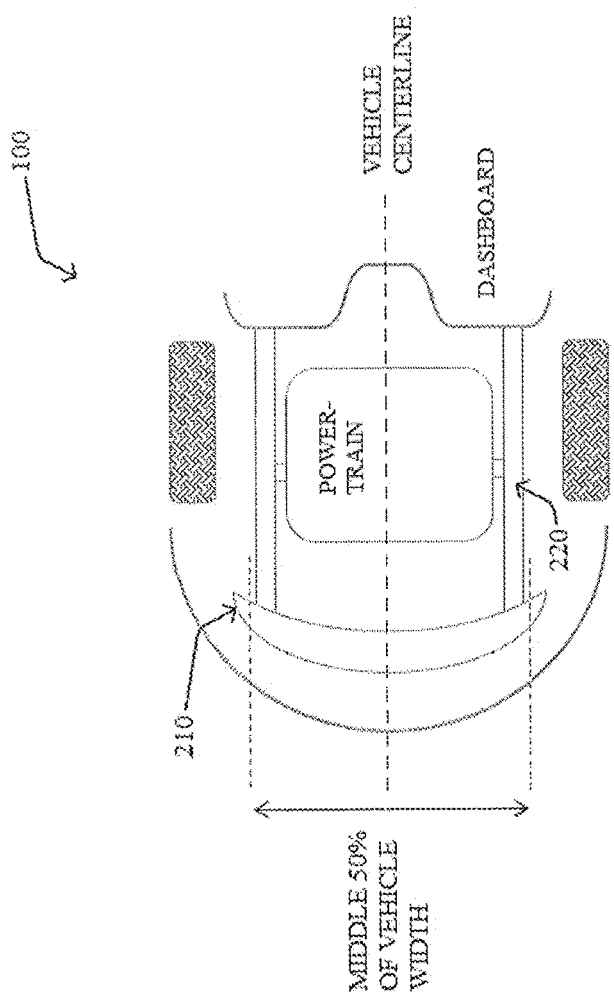
FIG. 2 illustrates a simplified conventional front body structure of a vehicle.

Referring now to FIG. 2, vehicle front body structures typically include two longitudinal sidemembers 220 perpendicularly attached to a front bumper beam 210 in the front and to a dashboard-type structure in the rear. The front bumper beam 210 extends transversely across a body of the vehicle 100, and the pair of longitudinal sidemembers extending longitudinally along the vehicle body, each of the longitudinal sidemembers 220 perpendicularly attach at a front end thereof to the front bumper beam 210. Additional structure on the outboard side (i.e., facing outward of the vehicle) of each longitudinal sidemember 220 provides suspension mounting strength for jounce and rebound loads. The multi-piece, stamped sheet metal, welded sidemembers 220 are generally orientated parallel to one another and extend longitudinally in the fore/aft direction of the vehicle with the powertrain placed within the pair. The longitudinal sidemembers 220 and front bumper beam 210 are the main "crush zone" structures for frontal and most offset impacts. However, they are concentrated within the middle 50% of vehicle width, as seen in FIG. 2.

Figure 3:
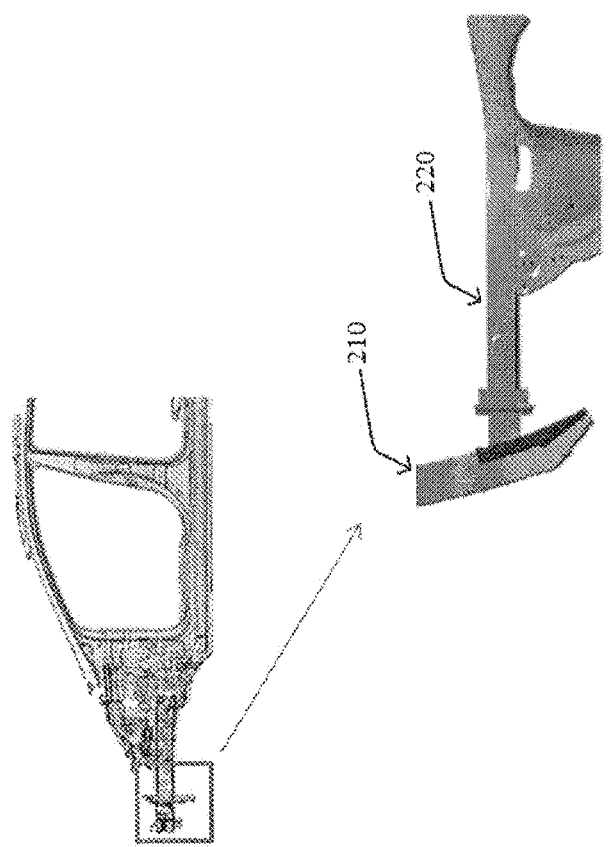
FIG. 3 illustrates a top-down view of the conventional vehicle front body structure, particularly, the attachment point between a front bumper beam and one longitudinal sidemember.
Figure 4:
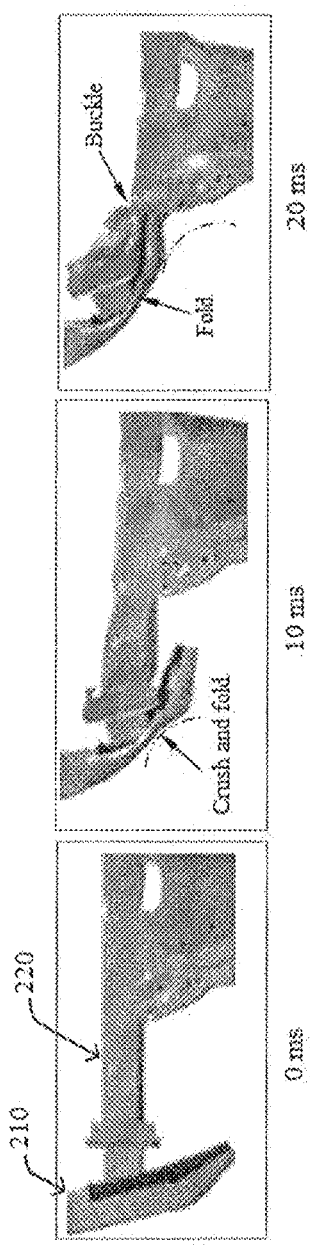
FIG. 4 illustrates a time sequence of deformation of the conventional vehicle front body structure in the event of an offset collision.

FIG. 3 provides a zoomed-in, top-down view of the conventional vehicle front body structure, particularly, the attachment point between the front bumper beam 210 and one longitudinal sidemember 220, and FIG. 4 illustrates a time sequence of deformation of the conventional vehicle front body structure in the event of an offset collision. In the conventional front body structure, the front bumper beam 210 and longitudinal sidemember 220 are positioned substantially within the middle 50% impact crush zone. As a result, the end portion of the front bumper beam 210 extending beyond the outboard edge of the longitudinal sidemember 220—otherwise referred to herein as the front bumper beam tip—is vulnerable in the event of an offset collision, such as that shown in FIG. 1B, and has a tendency to prematurely fold in response to an impact load.

As shown in FIG. 4, 10 ms after an offset collision occurs, the tip of the front bumper beam 210 (from the edge of the longitudinal sidemember 220 outboard) crushes and folds about the sidemember 220, minimizing energy absorption by the sidemember 220. Then, after 20 ms, the end portion of the bumper beam 210 completely folds away, ultimately buckling the longitudinal sidemember 220 with minimal crush. The result is a failure to maximize the kinetic energy absorption potential of the longitudinal sidemembers 220 and thus excessive cockpit intrusion.

Figure 5:
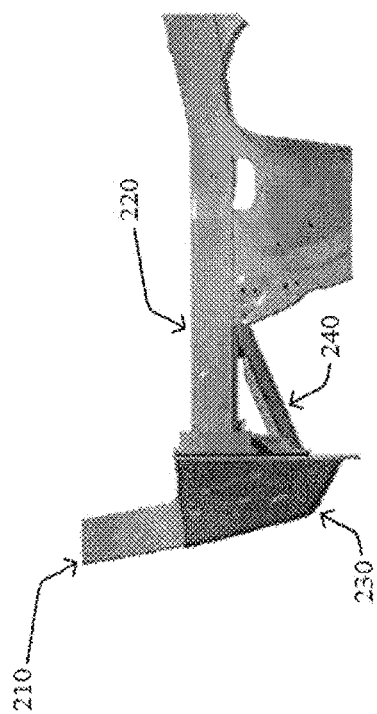
FIG. 5 illustrates a top-down view of an exemplary vehicle front body structure according to embodiments of the present disclosure.
Figure 6:
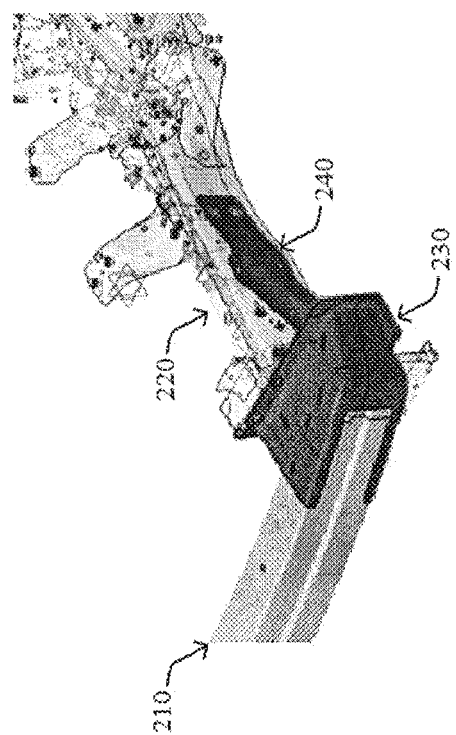
FIG. 6 illustrates a three-dimensional view of the exemplary vehicle front body structure according to embodiments of the present disclosure.

On the other hand, in the vehicle front body structure according to embodiments of the present disclosure, mechanisms are provided to reinforce the structural integrity of the front bumper beam 210 and the longitudinal sidemembers 220, and the vehicle as a whole, in the event of an offset collision by creating a load path for energy dispersal to the longitudinal sidemember 220. In particular, FIG. 5 illustrates a top-down view of an exemplary vehicle front body structure according to embodiments of the present disclosure, and FIG. 6 illustrates a three-dimensional view of the exemplary vehicle front body structure according to embodiments of the present disclosure. As shown in FIGS. 5 and 6, the front bumper beam 210 and one longitudinal sidemember 220 are reinforced by a front bumper tip enclosure 230 and a sidemember angle tie 240. The front bumper tip enclosure 230 and sidemember angle tie 240 assembly can be installed at the time of original vehicle assembly or can be retrofitted to existing vehicles with modification to the existing structure. Also, the front bumper tip enclosure 230 and sidemember angle tie 240 assembly may be situated on a driver-side of the vehicle 100 only, or a pair of front bumper tip enclosure 230 and sidemember angle tie 240 assemblies can be installed on the driver-side and the passenger-side of the vehicle 100, respectively.

The front bumper tip enclosure 230 may be attached to the front bumper beam 210 and substantially enclose an end portion of the front bumper beam 210, i.e., the front bumper beam tip, which extends outwardly beyond an outboard edge of the longitudinal sidemember 220. Meanwhile, the sidemember angle tie 240 may extend angularly with respect to the longitudinal sidemembers 220. A front end of the sidemember angle tie 240 may be attached to the front bumper tip enclosure 230 at a position outside of an imaginary area formed by the longitudinal sidemembers 220 and the front bumper beam 210, and a rear end of the sidemember angle tie 240 may be attached to one of the longitudinal sidemembers 220.

The sidemember angle tie 240 is an angled support structure extending rearward from approximately the outboard-most front bumper beam location to an outboard sidemember location. The rear end of the sidemember angle tie 240 may attach to an outboard face of the longitudinal sidemember 220 at a location inboard (i.e., facing inward of the vehicle) of the wheel envelope without connecting to the vehicle power plant mounting. The front end of the sidemember angle tie 240 can extend from an outboard tip of the front bumper beam 210 toward the longitudinal sidemember 220. With respect to attachment within the vehicle front body structure, the front end of the sidemember angle tie 240 can be longitudinally attached (i.e., the attached components are stacked in a longitudinal direction) to a rearward face of the front bumper tip enclosure 230, and the rear end of the sidemember angle tie 240 may be laterally attached (i.e., the attached components are stacked in a lateral direction) to an outboard face of the longitudinal sidemembers 220.

Figure 1:
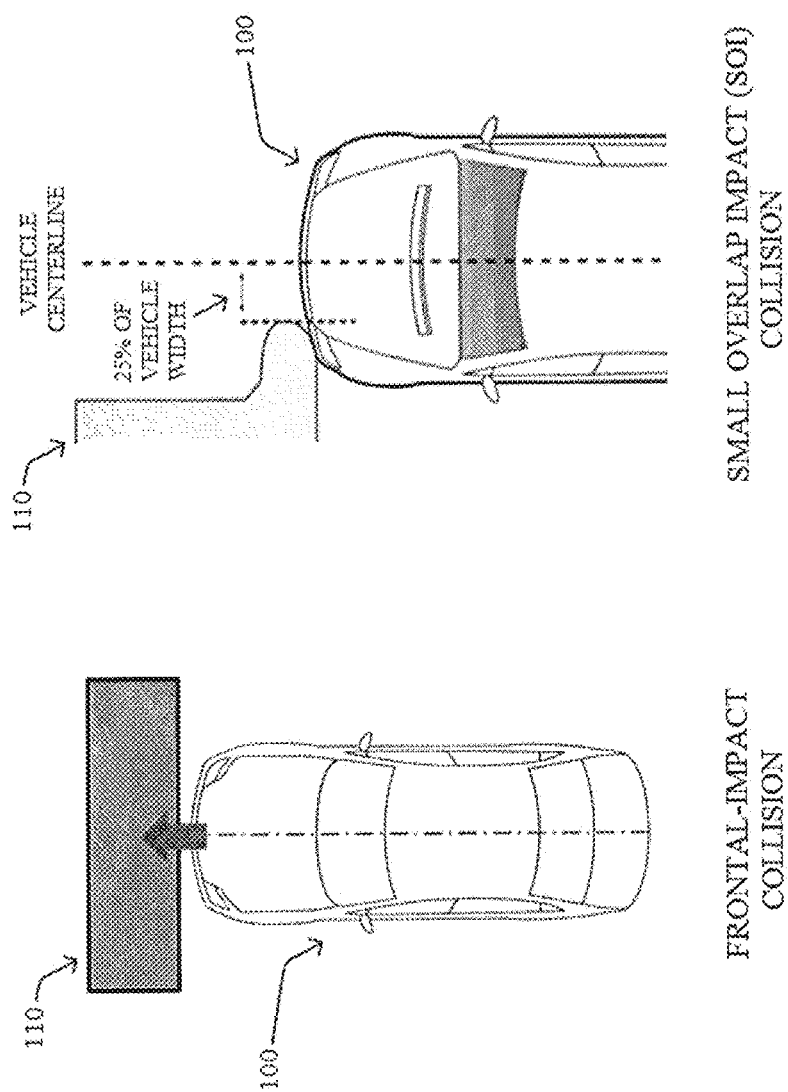
FIGS. 1A and 1B illustrate example collision testing.

Furthermore, unlike the longitudinal sidemembers 220, the front bumper tip enclosure 230 and sidemember angle tie 240 may be located substantially outside the middle 50% impact crush zone of typical vehicle architecture and thus can provide support in small offset impacts. Accordingly, during an offset impact, as shown in FIG. 1B, the front bumper tip enclosure 230 and sidemember angle tie 240 structures can work in unison to create a load path for energy dispersal to the longitudinal sidemembers 220. Importantly, increased energy displacement to the longitudinal sidemembers 220 mitigates the amount of force directed into the wheel and ultimately the occupant cage behind the wheel and ultimately reduces the amount of intrusion into the occupant zone.

The front bumper tip enclosure 230 can provide rigidity from the inboard connection point of the front bumper beam 210 and the longitudinal sidemember 220 to the outboard point of impact, effectively prolonging the folding of the outboard tip of the front bumper structure about the sidemember tip. Additionally, the front bumper tip enclosure 230 is configured to be crushed in order to absorb a portion of the vehicle's kinetic energy during impact and drive energy onward to the sidemember angle tie 240.

Meanwhile, the sidemember angle tie 240 provides the impact load an angular path to the longitudinal sidemember 220. That is, the sidemember angle tie 240 changes a direction of the impact load on the vehicle body to a longitudinal direction by transferring the impact load along an angular path to the one of the longitudinal sidemembers 220 to which the sidemember angle tie is attached. Furthermore, the sidemember angle tie 240 can prolong buckling at the front of the sidemember 220 before the entire system collapses.

The sidemember angle tie 240 can be positioned for optimal transference of the impact load during a collision. For instance, the outboard vertical wall of the sidemember angle tie 240 can align with the IIHS barrier—with reference to the offset collision in FIG. 1B—allowing for positive attack and engagement to axially load the longitudinal sidemember 220. Also, the sidemember angle tie 240 can be optimally angled, with respect to the longitudinal sidemember 220, and angled from the IIHS barrier, to maximize the load path to the longitudinal sidemember 220 while maintaining the wheel envelope package space.

Figure 7:
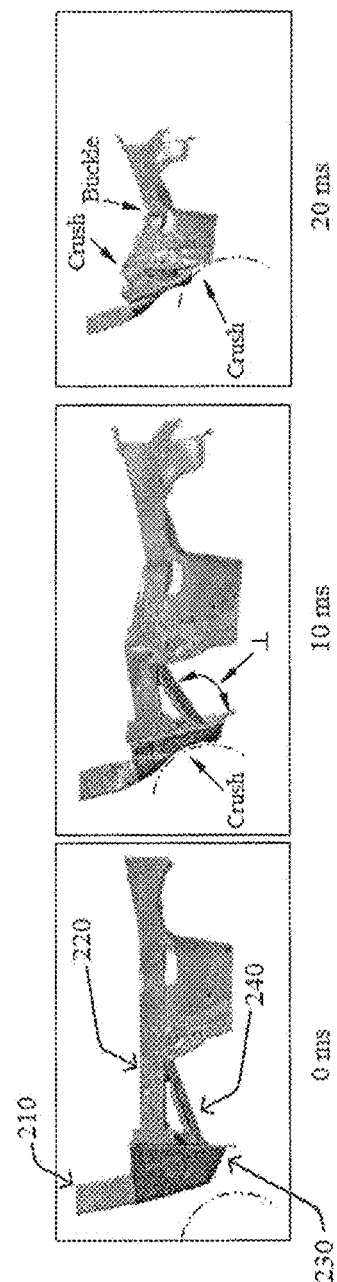
FIG. 7 illustrates a time sequence of deformation of the vehicle front body structure according to embodiments of the present disclosure in the event of an offset collision.

Compared to the conventional vehicle front body structure shown in FIGS. 3 and 4, the front bumper tip enclosure 230 and sidemember angle tie 240 assembly changes the deformation modes of the front bumper 210 and the longitudinal sidemember 220 and decreases the intrusion into the cockpit. In this regard, FIG. 7 illustrates a time sequence of deformation of the vehicle front body structure according to embodiments of the present disclosure in the event of an offset collision. As shown in FIG. 7, 10 ms after an offset collision occurs, the front bumper tip enclosure 230 crushes yet can remain predominately perpendicular in orientation to the longitudinal sidemember 220. The crushing of the front bumper tip enclosure 230 acts to absorb a portion of the vehicle's kinetic energy due to impact and drives energy onward to the sidemember angle tie 240. Also, the front bumper tip enclosure 230 can be rigidly formed to effectively prolong the folding of the outboard tip of the front bumper beam 210 about the sidemember 220. Further, the sidemember angle tie 240 can remain relatively straight while propagating the intrusion to the sidemember 220.

Then, after 20 ms, the side member angle tie 240 provides the impact load an angular path to the longitudinal sidemember 220 and prolongs buckling at the front of the sidemember until the entire system collapses. Once the front bumper tip enclosure 230 is crushed, crushing of the sidemember angle tie 240 and the longitudinal sidemember 220 is inducing, coupled with buckling of the sidemember rear, similar to sidemember behavior during frontal impact events proximate to the vehicle's center.

The front bumper tip enclosure 230 and sidemember angle tie 240 may be composed of seven high strength steel (HSS) components having various thicknesses that can be tuned to a vehicle's specific architecture, depending upon original equipment manufacturer (OEM) requirements. In this regard, FIGS. 8A and 8B illustrate exemplary exploded views of the front bumper tip enclosure 230 and sidemember angle tie 240. As shown in FIGS. 8A and 8B, the front bumper tip enclosure 230 and the sidemember angle tie 240 may each be composed of multiple components. In one example, each component is made, either partially or entirely, of steel. Further, each component may be formed having a uniform grade and thickness. That is, the front bumper tip enclosure 230 and the sidemember angle tie 240 may be formed with respective uniform thicknesses.

The front bumper tip enclosure 230, as shown in FIG. 8A, may include an upper piece 232, a lower piece 234, and a side attachment member 236. The upper piece 232 may cover an upper part of the end portion (tip) of the front bumper beam 210, and the lower piece 234 may cover a lower part of the end portion of the front bumper beam 210. The upper piece 232 and lower piece 234 may prolong folding of the upper part and lower part of the front bumper beam 210, respectively, after offset impact. When assembled, the upper piece 232 and the lower piece 234 can be attached to one another at one or more attachment points, as described in further detail hereinbelow.

Meanwhile, the side attachment member 236 can securely attach and reinforce the front bumper tip enclosure 230 to the longitudinal sidemember 220. More specifically, the side attachment member 236 may attach at least one of the upper piece 232 and the lower piece 234 of the front bumper tip enclosure 230 to at least one of the sidemember angle tie 240 and the longitudinal sidemember 220. When assembled, the end portion (tip) of the front bumper beam 210 may be substantially enclosed by the upper piece 232, the lower piece 234, and the side attachment member 236 of the front bumper tip enclosure 230, as shown in greater detail in FIGS. 9A-9D. Thus, the front bumper tip enclosure 230 can prevent premature folding of the front bumper tip about the longitudinal sidemembers 220.

The sidemember angle tie 240, as shown in FIG. 8B, may include an inner piece 242, an outer piece 244, a front attachment member 246, and a rear attachment member 248. The inner piece 242 may face inboard of the vehicle 100, and the outer piece 244 may face outboard of the vehicle 100. The inner and outer piece 242, 244 can together provide an axial crush and transfer the impact load to longitudinal sidemember 220 attached thereto. When assembled, the inner piece 242 and the outer piece 244 can be attached to one another at one or more attachment points, as described in further detail hereinbelow. Furthermore, the inner piece 242 and outer piece 244 can be shaped such that a hollow passageway is formed therethrough. Specifically, the inner piece 242 and outer piece 244 can be formed in a "hat-like" shape, that is, a middle portion of the inner piece 242 and/or outer piece 244 of the sidemember angle tie 240 can be U-shaped, whereby the U-shaped portion is flanked on opposing sides thereof by flat portions, as shown in FIG. 8B.

Meanwhile, the front attachment member 246 may be positioned at the front end of the sidemember angle tie 240 and attach at least one of the inner piece 242 and the outer piece 244 to at least one of the longitudinal sidemember 220 and the front bumper tip enclosure 230. In this regard, the front attachment member 246 can be bent, as shown in greater detail in FIGS. 10A-10E, so as to longitudinally attach the sidemember angle tie 240 to the front bumper tip enclosure 230 and laterally attach the sidemember angle tie 240 to the longitudinal sidemember. Thus, the front attachment member 246 can reinforce the inner piece 242 and outer piece 244 to prevent buckling at the connection point between the sidemember angle tie 240 and the front bumper tip enclosure 230, in addition to reinforcing the upper part 232 and lower part 234 of the front bumper tip enclosure 230 to reduce front bumper folding about the longitudinal sidemember 220. In addition, the rear attachment member 248 may be positioned at the rear end of the sidemember angle tie 240 and attach at least one of the inner piece 242 and the outer piece 244 to the longitudinal sidemember 220. By doing so, the rear attachment member 248 can distribute an impact load longitudinally to the longitudinal sidemember 220.

It should be understood that the individual component(s) which comprise the front bumper tip enclosure 230 and sidemember angle tie 240 can vary in terms of shape, size, material, function, arrangement, position, and the like. That is, the configuration of components shown in FIGS. 8A and 8B is illustrated for demonstration purposes only and should not be treated as limiting the front bumper tip enclosure 230 and sidemember angle tie 240 to the illustrated configuration. Rather, the front bumper tip enclosure 230 and sidemember angle tie 240 can be modified in any suitable manner, as would be understood by a person of ordinary skill in the relevant art, within the scope of the present claims.

Figure 9A:
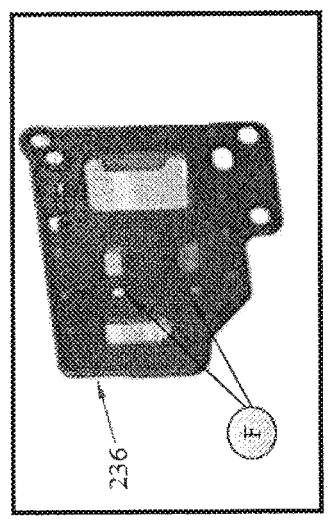
FIGS. 9A-9D illustrate various exemplary views of the front bumper tip enclosure.

FIGS. 9A-9D illustrate various exemplary views of the front bumper tip enclosure 230. A top-down view of the front bumper tip enclosure 230 is shown in FIG. 9A with cross-sectional lines A and B. Views corresponding to the cross-sectional lines A and B are provided in FIGS. 9C and 9D, respectively.

Figure 9B:
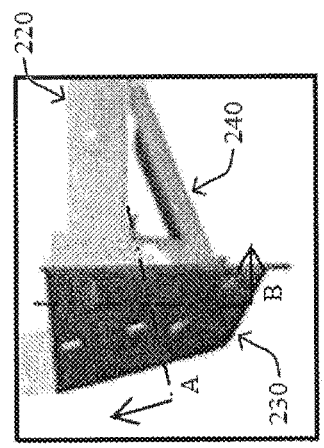

FIG. 9B illustrates a rear view of the front bumper tip enclosure 230, showing the side attachment member 236 which may be positioned behind the front bumper beam 210 and the upper part 232 and lower part 234 of the front bumper tip enclosure 230. The side attachment member 236 may be provided with various attachment points for attaching the front bumper tip enclosure 230 to other components of the vehicle front body, as described in further detail hereinbelow. For instance, attachment points F shown in FIG. 9B may be provided for attaching the side attachment member 236 (and the front bumper tip enclosure 230, as a result) to the sidemember angle tie 240. The attachment at points F may be accomplished through any suitable means known to one of ordinary skill in the art for attaching one vehicle front body structural component to another, such as bolts, welding, adhesives, and so forth. However, the attachment points F illustrated in FIG. 9B for exemplary purposes is configured to receive bolts that can be mechanically fastened to attach the front bumper tip enclosure 230 to the sidemember angle tie 240.

Figure 9C:
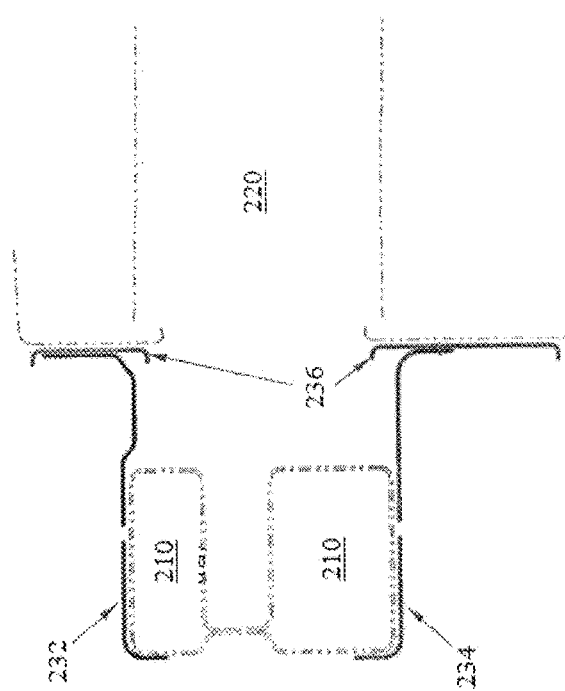
Figure 9D:
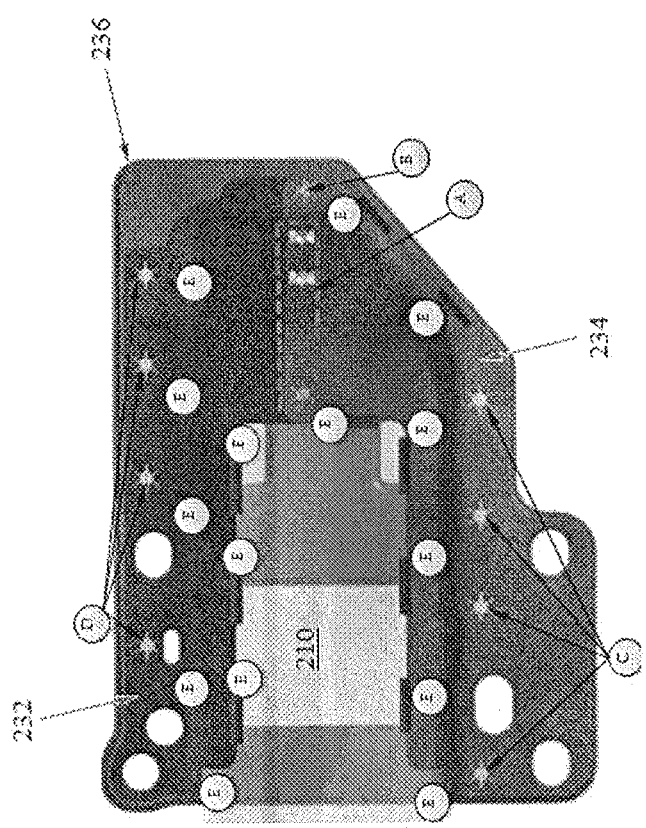

FIG. 9C illustrates an exemplary cross-sectional view along line A of the front bumper tip enclosure 230, and FIG. 9D illustrates an exemplary cross-sectional view along line B of the front bumper tip enclosure 230. As shown in FIGS. 9C and 9D, the front bumper tip enclosure 230 may be a three-component assembly, including the upper part 232, lower part 234, and side attachment member 236. The three-component assembly of the front bumper tip enclosure 230 may enclose the outboard end portion (tip) of the front bumper beam 210 and progress inboard to the front tip of the longitudinal sidemember 220.

As shown in FIG. 9C, the upper part 232 of the front bumper tip enclosure 230 can cover an upper portion of the front bumper beam 210, and the lower part 234 of the front bumper tip enclosure 230 can cover a lower portion of the front bumper beam 210. The front bumper beam 210 may, or may not, be structural separated into upper and lower portions, as shown in FIG. 9C, depending on the structure of the vehicle 100. Additionally, the front bumper tip enclosure 230 can attach to the longitudinal sidemember 220 via the side attachment member 236. More specifically, the upper part 232 and the lower part 234 can attach to the longitudinal sidemember 220 via the side attachment member 236. As such, the side attachment member 236 can be sandwiched between the upper or lower parts 232, 234 and the longitudinal sidemember 220, when assembled.

As shown in FIG. 9D, various attachment points can be provided throughout the front bumper tip enclosure 230 to attach a component of the front bumper tip enclosure 230 to other component(s) of the front bumper tip enclosure 230 or to another component in the vehicle front body. The attachment technique may include any suitable means known to one of ordinary skill in the art for attaching one vehicle front body structural component to another, such as bolts, welding, adhesives, and so forth. Moreover, the arrangement of the attachment points may be modified in any suitable manner, and as such, the arrangement of attachment points A-E shown in FIG. 9D should not be treated as limiting the scope of the claimed invention.

The example attachment points A-E shown in FIG. 9D represent one example for securing the front bumper tip enclosure 230 within the vehicle front body structure. For instance, attachment point A can be a welding point to adjoin the upper part 232 to the lower part 234 at a spot where the upper part 232 and lower part 234 overlap. In one example, the welding at attachment point A (or other attachment points) may involve resistive spot welding (RSW) or gas metal arc welding (GMAW), otherwise known as $CO_2$ welding. At attachment point B, the upper part 232, lower part 234, and side attachment member 236 can be welded to one another at a spot where all of said components overlap. At attachment points C, the lower part 234 can be welded at multiple points to the side attachment member 236 along a lower periphery of the lower part 234. At attachment points D, the upper part 232 can be welded at multiple points to the side attachment member 236 along an upper periphery of the upper part 232. At attachment points E, the upper part 232 and lower part 234 can be welded at multiple points to the front bumper beam 100.

Figures 10A, 10B:
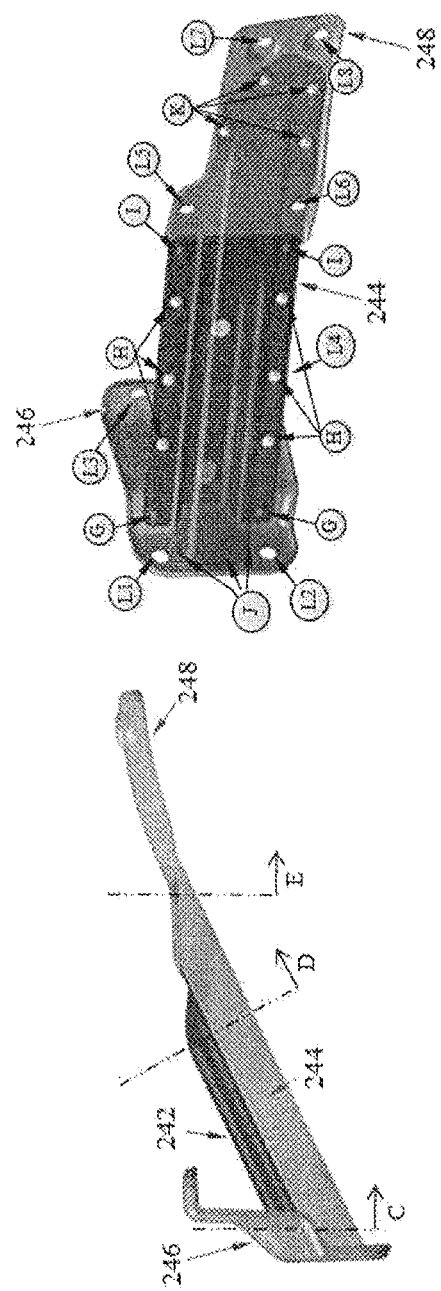
FIGS. 10A-10E illustrate various exemplary views of the sidemember angle tie.

FIGS. 10A-10E illustrate various exemplary views of the sidemember angle tie 240. A top-down view of the sidemember angle tie 240 is shown in FIG. 10A with cross-sectional lines C, D and E. Views corresponding to the cross-sectional lines C, D and E are provided in FIGS. 10C, 10D and 10E, respectively. As shown in FIG. 10A, the sidemember angle tie 240 may be a four-component assembly, including the outer part 242, inner part 244, front attachment member 246, and rear attachment member 248. The four-component assembly of the sidemember angle tie 240 may attach longitudinally at the rearward face of the front bumper tip enclosure 230, via the front attachment member 246, and laterally into the longitudinal sidemember 220, via the front attachment member 246 and rear attachment member 248.

FIG. 10B illustrates an exemplary three-dimensional view of the sidemember angle tie 240. As shown in FIG. 10B, various attachment points can be provided throughout the sidemember angle tie 240 to attach a component of the sidemember angle tie 240 to other component(s) of the sidemember angle tie 240 or to another component in the vehicle front body. As explained above, the attachment technique may include any suitable means known to one of ordinary skill in the art for attaching one vehicle front body structural component to another, such as bolts, welding, adhesives, and so forth. Moreover, the arrangement of the attachment points may be modified in any suitable manner, and as such, the arrangement of attachment points G-L shown in FIG. 10B should not be treated as limiting the scope of the claimed invention.

The example attachment points G-L shown in FIG. 10B represent one example for securing the sidemember angle tie 240 within the vehicle front body structure. For instance, attachment points G can be welding points to adjoin the inner and outer part 242, 244 to the front attachment member 246. In one example, the welding at attachment points G (or other attachment points) may involve RSW or GMAW, otherwise known as $CO_2$ welding. At attachment points H, the inner part 242 and the outer part 244 can be welded at multiple points to one another in a middle section thereof along their upper and lower periphery. At attachment points I, the inner and outer part 242, 244 can be welded at multiple points to the rear attachment member 248. At attachment points J, the outer part 242 can be welded at multiple points to the front attachment member 246. At attachment points K, the outer part 242 can be welded at multiple points to the rear attachment member 248.

Figure 12A:
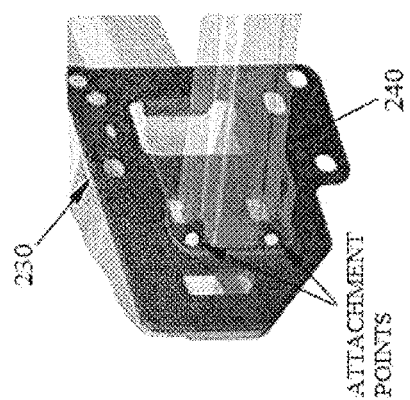
Figure 12B:
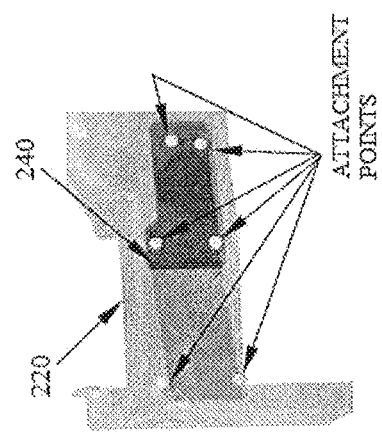

At attachment points L1-L8, the sidemember angle tie 240 can be attached to the vehicle front body structure. For instance, attachment points L1-L8 as shown in FIG. 10B are openings in the sidemember angle tie 240 which accept bolts for securing the sidemember angle tie 240 to another component (though the claimed embodiments are not limited thereto). Attachment points L1 and L2 can be used to longitudinally connect the front attachment member 246 (and the entire sidemember angle tie 240, as a result) to the front bumper tip enclosure 230. Meanwhile, attachment points L3 and L4 (hidden in view) can be used to laterally connect the front attachment member 246 (and the entire sidemember angle tie 240, as a result) to the longitudinal sidemember 220. Therefore, because the front attachment member 246 has a L-like shape, it is possible for the sidemember angle tie 240 to attach both longitudinally and laterally to adjacent components, thereby strengthening the tip of the front bumper beam 210 and preventing premature buckling of the longitudinal sidemember 220. Rear attachment points L5-L8 can be used to connect the rear attachment member 248 (and the entire sidemember angle tie 240, as a result) to an outboard face of the longitudinal sidemember 220. Along these lines, FIGS. 12A-12C illustrate additional exemplary three-dimensional views showing the attachment points on the front bumper tip enclosure 230 and sidemember angle tie 240 assembly.

Figure 10E:
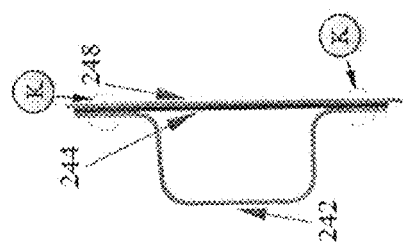
Figure 10D:
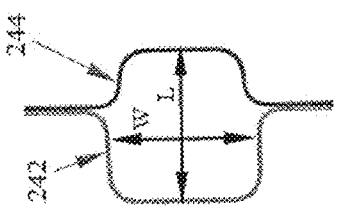
Figure 10C:
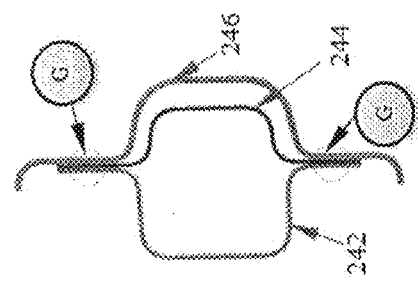

FIG. 10C illustrates an exemplary cross-sectional view along line C of the sidemember angle tie 240, FIG. 10D illustrates an exemplary cross-sectional view along line D of the sidemember angle tie 240, and FIG. 10E illustrates an exemplary cross-sectional view along line E of the sidemember angle tie 240. As shown in FIGS. 10C-10E, portions of the outer part 242 and the inner part 244 may be formed in a hat-like shape, that is, formed having a middle U-shaped portion that is flanked on both sides thereof by a flat portion, somewhat resembling the shape of a hat. A portion of the front attachment member 246 may be similarly formed. As a result, the outer part 242 and inner part 244 can form a hollow passageway therethrough when the two components are assembled, as shown in FIGS. 10C-10E. The variables 'W' and shown in FIG. 10D defining the dimensions of the passageway therethrough can vary according to the vehicle and/or the preferences of the designer. In one example, 'W' and may be within a range of 30 mm to 50 mm. Further, as shown in FIG. 10E, the shape of the inner part 244 can change from a hat-like shape to a flat plate at the rear end of the inner part 244, allowing the rear attachment member 248 to be positioned flatly against the inner part 244, effectively creating a double-walled shear plate that enables the longitudinal sidemember 220 and the sidemember angle tie 240 to crush together during a collision. Notably, attachment points G and K are shown in FIGS. 10C and 10E, respectively, corresponding to the attachment points shown in FIG. 10B.

Figure 11:
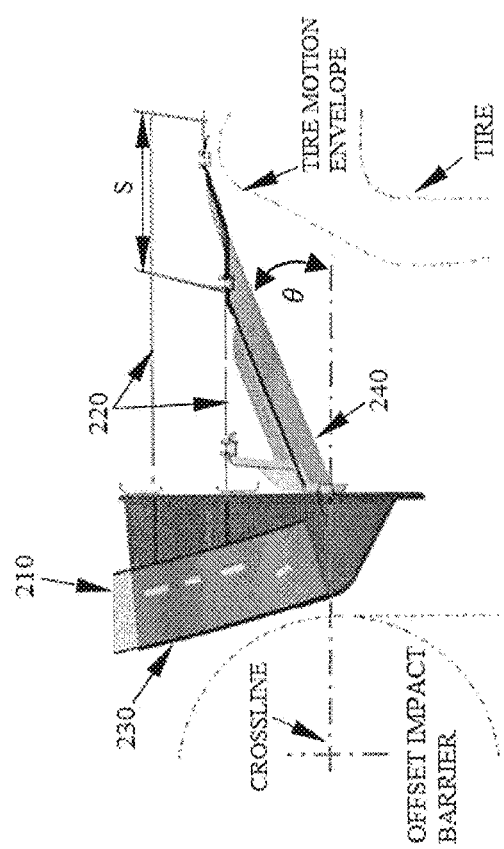
FIG. 11 illustrates an exemplary view of the front bumper tip enclosure and sidemember angle tie in relation to an offset impact barrier and other vehicle front body components.

Referring now to FIG. 11, which illustrates an exemplary view of the front bumper tip enclosure 230 and sidemember angle tie 240 in relation to an offset impact barrier and other vehicle front body components, the sidemember angle tie 240 extends at an angle θ with respect to the longitudinal sidemembers 220 and with respect to an imaginary cross-line of the offset impact barrier that delivers an impact load onto the vehicle 100. The angle θ can vary according to the vehicle and/or the preferences of the designer. In one example, the angle θ can be within a range of 15 degrees and 30 degrees. Notably, increasing the angle θ can eventually increase buckling of the front of the longitudinal sidemember 220, as well as cockpit intrusion. Conversely, decreasing the angle θ can eventually decreases positive engagement of the sidemember angle tie 240, which decreases energy displacement to the longitudinal sidemember 220 and increases cockpit intrusion. Thus, calculating an optimal angle θ at which the sidemember angle tie 240 extends with respect to the longitudinal sidemembers 220 for a given vehicle is necessary.

As further shown in FIG. 11, the sidemember angle tie 240 can attach to an outboard face of the longitudinal sidemember 220 at a position inboard of the tire motion envelope (i.e., wheel envelope) in order to transfer the impact load to the longitudinal sidemember 220 while maintaining the tire motion envelope package space. Additionally, the length 'S' of the connection between the sidemember angle tie 240 and longitudinal sidemember 220 can vary according to the vehicle and/or the preferences of the designer. In one example, the length 'S', otherwise referred to herein as the double-walled shear plate as shown in FIG. 10E, can be within a range of 150 mm to 190 mm.

Accordingly, vehicles having the C according to embodiments of the present disclosure installed therein exhibit enhanced frontal crash protection and improved IIHS ratings in the Small Overlap Impact (SOI) test, as shown in FIG. 1B, while adding minimal mass to the vehicle itself at a relatively low cost. The front bumper tip enclosure and sidemember angle tie assembly can be installed at the time of original vehicle assembly or can be retrofitted to existing vehicles with slight modification to the existing structure. The front bumper tip enclosure and sidemember angle tie assembly can be readily optimized to a wide variety of vehicle architectures. In addition, the front bumper tip enclosure and sidemember angle tie assembly may be situated on a driver-side of the vehicle only, or installed on both the driver-side and the passenger-side of the vehicle, respectively.

Testing has revealed that, compared to conventional vehicles, vehicles having the front bumper tip enclosure and sidemember angle tie assembly installed therein exhibit reduced cockpit intrusion by an average of 18-46% due to increased energy absorption at the front bumper beam and later the longitudinal sidemembers. Testing has further revealed that the front bumper tip enclosure and sidemember angle tie assembly redistributes energy during an offset collision event away from the bodyside (by at least −16%) and toward the front bumper beam (by at least 54%) and the longitudinal sidemembers (by at least 123%). The increased energy that is longitudinally transferred to the longitudinal sidemembers results in reduced cockpit intrusion, most notably at the lower hinge pillar, rocker panel, and upper hinge pillar, for improved occupant zone structural protection.

While there have been shown and described illustrative embodiments that provide for a front body structure of a vehicle resulting in enhanced crash protection, it is to be understood that various other adaptations and modifications may be made within the spirit and scope of the embodiments disclosed herein. For example, the specific components described herein which comprise the front bumper tip enclosure and sidemember angle tie (e.g., FIGS. 8A and 8B), the specific attachment points described herein which attach components of the front bumper tip enclosure and sidemember angle tie to some other component(s) thereof or some other component(s) of the vehicle architecture (e.g., FIGS. 9D, 10B and 12A-12C), and the specific angles and dimensions of the front bumper tip enclosure and sidemember angle tie described herein (e.g., FIG. 11), as well as any aspect thereof, are provided merely for demonstration purposes and for understanding of the embodiments. Thus, the disclosed embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A front body structure of a vehicle for enhanced crash protection comprising:
    a front bumper beam extending transversely across a body of the vehicle;
    a pair of longitudinal sidemembers extending longitudinally along the vehicle body, each of the longitudinal sidemembers perpendicularly attached at a front end thereof to the front bumper beam;
    a front bumper tip enclosure attached to the front bumper beam and substantially enclosing an end portion of the front bumper beam; and
    a sidemember angle tie extending at an angle with respect to the longitudinal sidemembers, a front end of the sidemember angle tie attached to the front bumper tip enclosure, and a rear end of the sidemember angle tie attached to one of the longitudinal sidemembers, wherein
    the sidemember angle tie changes a direction of an impact load on the vehicle body to a longitudinal direction by transferring the impact load along an angular path to the one of the longitudinal sidemembers to which the sidemember angle tie is attached, and
    the front bumper tip enclosure includes an upper piece covering an upper part of the end portion of the front bumper beam and a lower piece covering a lower part of the end portion of the front bumper beam, the upper piece and the lower piece attached to one another at one or more attachment points.

2. The front body structure of claim 1, wherein the rear end of the sidemember angle tie is attached to an outboard face of the one of the longitudinal sidemembers.

3. The front body structure of claim 1, wherein the rear end of the sidemember angle tie is attached to the one of the longitudinal sidemembers at a position inboard of a wheel envelope of the vehicle.

4. The front body structure of claim 1, wherein the front end of the sidemember angle tie extends from an outboard tip of the front bumper beam toward the one of the longitudinal sidemembers.

5. The front body structure of claim 1, wherein the front end of the sidemember angle tie is longitudinally attached to a rearward face of the front bumper tip enclosure, and the rear end of the sidemember angle tie is laterally attached to an outboard face of the one of the longitudinal sidemembers.

6. The front body structure of claim 1, wherein the front bumper tip enclosure extends from an outboard tip of the front bumper beam to at least an attachment point between the front bumper beam and the one of the longitudinal sidemembers.

7. The front body structure of claim 1, wherein the front bumper tip enclosure prolongs folding of the end portion of the front bumper beam about the one of the longitudinal sidemembers.

8. The front body structure of claim 1, wherein the front bumper tip enclosure is configured to be crushed to absorb the impact load on the vehicle body.

9. The front body structure of claim 7, wherein the crushing of the front bumper tip enclosure transfers the impact load to the sidemember angle tie.

10. The front body structure of claim 1, wherein the sidemember angle tie prolongs buckling of the one of the longitudinal sidemembers to which the sidemember angle tie is connected.

11. The front body structure of claim 1, wherein the front bumper tip enclosure further includes a side attachment member that attaches at least one of the upper piece and the lower piece of the front bumper tip enclosure to at least one of the sidemember angle tie and the one of the longitudinal sidemembers.

12. The front body structure of claim 11, wherein the end portion of the front bumper beam is substantially enclosed by the upper piece, the lower piece, and the side attachment member of the front bumper tip enclosure.

13. The front body structure of claim 1, wherein the sidemember angle tie includes an inner piece facing inboard of the vehicle and an outer piece facing outboard of the vehicle, the inner piece and the outer piece attached to one another at one or more attachment points.

14. The front body structure of claim 13, wherein a hollow passageway is formed within the inner piece and the outer piece of the sidemember angle tie.

15. The front body structure of claim 13, wherein the sidemember angle tie further includes a front attachment member positioned at the front end of the sidemember angle tie that attaches at least one of the inner piece and the outer piece of the sidemember angle tie to at least one of the front bumper tip enclosure and the one of the longitudinal sidemembers.

16. The front body structure of claim 13, wherein the sidemember angle tie further includes a rear attachment member positioned at the rear end of the sidemember angle tie that attaches at least one of the inner piece and the outer piece of the sidemember angle tie to the one of the longitudinal sidemembers.

17. The front body structure of claim 1, wherein the angle at which the sidemember angle tie extends with respect to the one of the longitudinal sidemembers is between 15 degrees and 30 degrees.

18. The front body structure of claim 1, wherein the front bumper tip enclosure and the sidemember angle tie are formed with respective uniform thicknesses.

19. The front body structure of claim 1, wherein the front bumper tip enclosure and the sidemember angle tie are formed of steel.

20. The front body structure of claim 1, wherein a middle portion of the sidemember angle tie is U-shaped, and the U-shaped portion is flanked on opposing sides thereof by flat portions.

21. The front body structure of claim 1, wherein the front bumper tip enclosure and the sidemember angle tie are situated on a driver-side of the vehicle.

22. The front body structure of claim 1, wherein the front bumper tip enclosure and the sidemember angle tie are one of a pair of front bumper tip enclosures and a pair of sidemember angle ties, respectively, one of the front bumper tip enclosures and one of the sidemember angle tie are situated on a driver-side of the vehicle, and the other front bumper tip enclosure and the other of the sidemember angle tie are situated on a passenger-side of the vehicle.

* * * * *